United States Patent
Palazzolo

[15] 3,672,190
[45] June 27, 1972

[54] DEVICE FOR PREVENTING UNAUTHORIZED REMOVAL OF PORTABLE EQUIPMENT

[72] Inventor: Mario Palazzolo, Jackson Heights, N.Y.

[73] Assignee: Di Mar Metal Fabricators, Inc., Long Island City, N.Y.

[22] Filed: June 24, 1970

[21] Appl. No.: 49,394

[52] U.S. Cl. ........................................70/58, 70/14, 70/232
[51] Int. Cl. ...................................E05b 73/00, F16b 41/00
[58] Field of Search ..................70/57, 58, 14, 62, 63, 232, 70/158, DIG. 57; 248/203, 25

[56] References Cited

UNITED STATES PATENTS

| | | | |
|---|---|---|---|
| 1,957,557 | 5/1934 | Schwahn | 70/232 |
| 3,434,312 | 3/1969 | Buchman | 70/58 |
| 3,564,879 | 2/1971 | Bennett | 70/232 |

FOREIGN PATENTS OR APPLICATIONS 1,045,219  6/1953  France.................................70/232

Primary Examiner—George F. Mautz
Assistant Examiner—Edward J. McCarthy
Attorney—Samuel Stearman

[57] ABSTRACT

A device to prevent theft or other unauthorized removal of portable equipment, such as typewriters, adding machines and the like, from their normal location or places of use. The protective device comprises a bar readily attachable by fasteners passing through the bar and through openings in the desk top, shelf or other supporting member, and into the base of the piece of portable equipment. The latter is thus held in firm engagement with the supporting member. Access to the attaching bar and fasteners is prevented by a trough-like member which encases the attaching bar and the fasteners. The encasing member is provided with lock means for securing it in position, so as thereby to prevent any but an authorized person from gaining access to the fasteners associated with the attaching bar.

8 Claims, 7 Drawing Figures

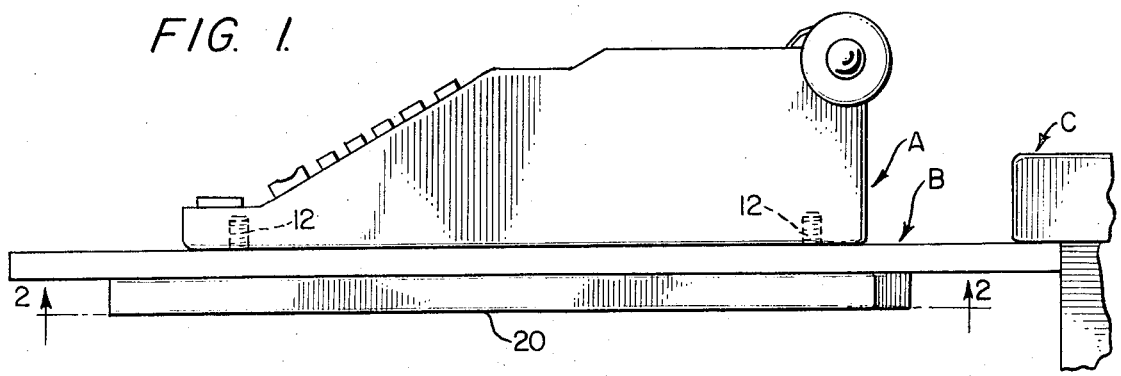
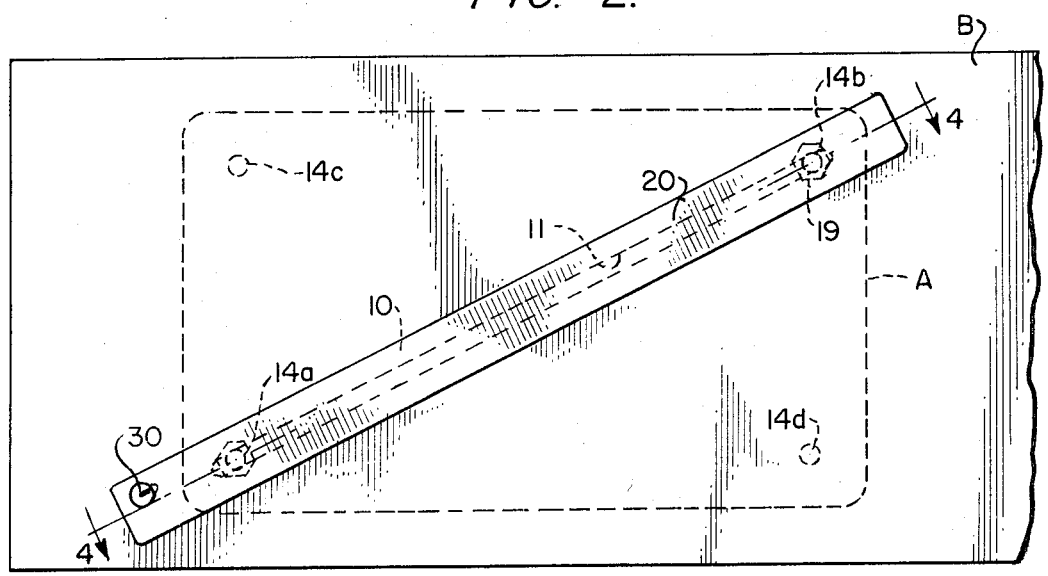
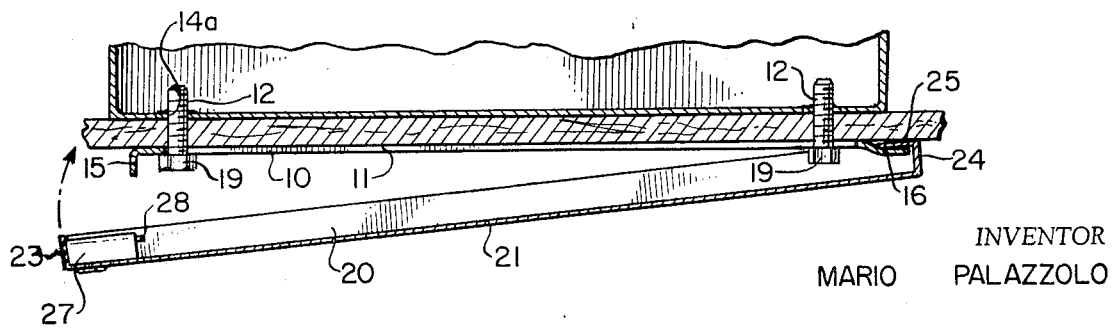
INVENTOR
MARIO PALAZZOLO
BY Samuel Stearman
ATTORNEY

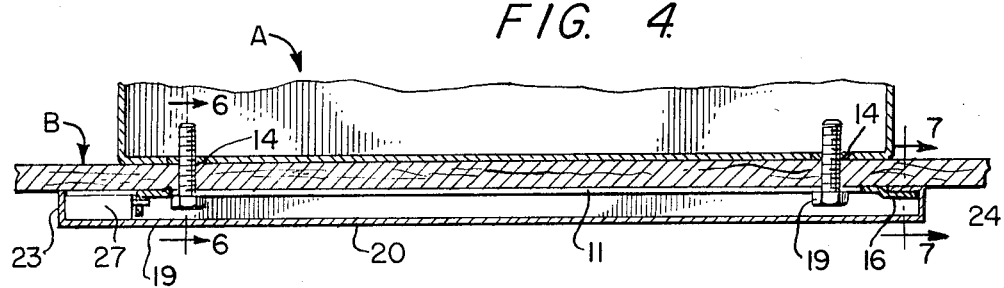
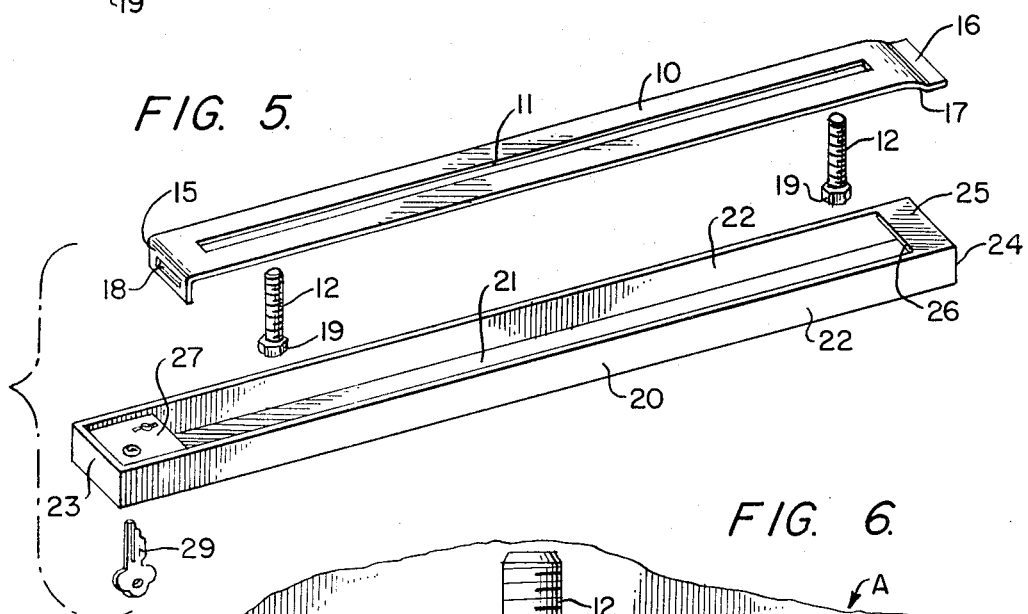
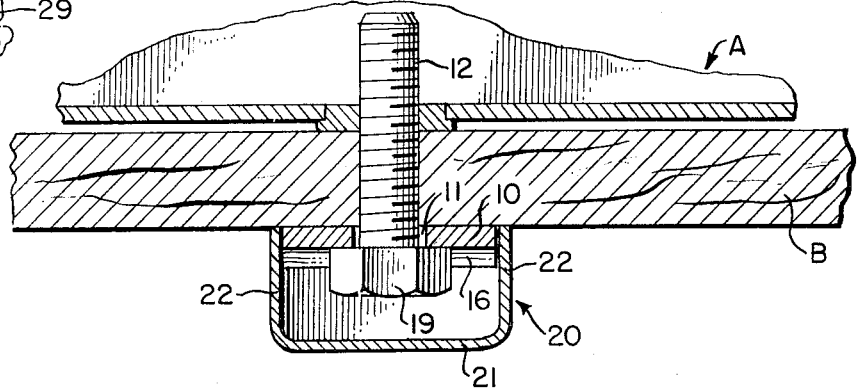
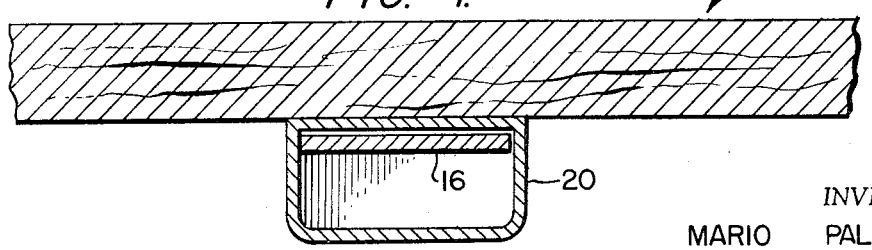
INVENTOR
MARIO PALAZZOLO

DEVICE FOR PREVENTING UNAUTHORIZED REMOVAL OF PORTABLE EQUIPMENT

This invention relates to means for preventing larcenous and other unauthorized removal of portable equipment and devices, such as typewriters, adding machines, dictating machines, photocopiers, or the like, from their intended or customary position.

In recent years, there has arisen an almost unbelievably great increase in the incidence of thievery of portable equipment of the character indicated above, from offices or other places of business. This has been particularly true in the case of such equipment situated in offices located in multi-story buildings. The great and rapid increase in the incidence of such thievery from offices in multi-story buildings has been attributed in large measure, by police and other authorities knowledgeable in the subject, to the increase in the use of automatic, passenger-operated elevators. This type of elevator apparently has made it much easier for thieves to engage in (and indeed to specialize) in this form of unlawful activity. That is to say, the thieves are thereby more easily able to remove a piece of equipment such as a typewriter, adding machine or the like, from its regular or accustomed place on a desk or other supporting member in an office, carry it into an elevator and leave the building, without arousing suspicion or curiosity on the part of building attendants or anyone authorized to question him or to retard or prevent his escape.

The principal object of the present invention is to provide a device for preventing the unauthorized removal of portable equipment, such as that of the types indicated, from the normal or desired location or place of use thereof.

Another object of the invention is to provide a device for the purpose above set forth, which embodies means for attaching such portable equipment to a supporting member in a desired position, and which further embodies means for preventing access to such attaching means without use of a key to actuate a locking mechanism associated with the device.

Another object of the invention is to provide a protective device of the character above set forth, constructed so that it may readily be employed for the above-stated intended purpose, to prevent unauthorized removal of equipment of the kind mentioned and of a wide range of base dimensions.

Still another object of the invention is to provide a protective device of the character described, which is readily applicable to office furniture of various designs and construction, including desks having extension panels for supporting typewriters, etc., tables, and roller stands or similar supports for typewriters, adding machines, photocopiers, etc.

A still further object of the invention is to provide a device as aforesaid, constructed so as to be attachable to a supporting surface of the furniture in a manner not to be normally visible, obtrusive, or otherwise inconvenient or objectionable to the user of the equipment.

The foregoing and other objects and advantages of the invention will more clearly appear from the description herebelow and from the accompanying drawings, in which:

FIG. 1 is a view, in side elevation, illustrating the device of the invention as it appears when installed for preventing unauthorized removal of a typewriter from a supporting member associated with an office desk or the like;

FIG. 2 is a bottom plan taken along line 2—2 of FIG. 1;

FIG. 3 is a view in cross-section, showing one of the parts of the device partially disconnected from the other at one of the ends thereof;

FIG. 4 is a view in cross-section, taken along lines 4—4 of FIG. 2;

FIG. 5 is an exploded view showing the parts of the device separated from one another; and FIGS. 6 and 7 are enlarged cross-sectional views taken, respectively, along lines 6—6 and 7—7 of FIG. 4.

In the drawings, the same reference characters refer to the same elements or parts of the device throughout the several views.

For purposes of description, the protective device of the invention is herein illustrated in conjunction with a typewriter, indicated by A, such as is in common or conventional use in offices. The machine is shown resting on a shelf or similar support B, such as usually constitutes a part of an office desk, indicated by letter C. As will be understood, the typewriter indicated at A is but illustrative of portable office equipment, e.g., calculating machines, typewriters, photocopiers, etc., utilized in offices and constituting frequent objects of thievery, as above described. The support B is but typical of various forms of tables, stands, shelves, and the like, for supporting office equipment, such as that mentioned, for the normal use of the latter.

Referring more in detail to the drawings, the preferred embodiment of the invention therein illustrated is in the form of a device consisting essentially of an attaching bar, indicated generally by the numeral 10, and a casing or protective shield, indicated generally by numeral 20.

The member 20 is suitably shaped and dimensioned so as to encase the attaching bar and engage the latter in a position enabling the two members to be interlocked with one another. Preferably, this interlocking of members 10 and 20 is by means of a lock disposed in fixed position at one end of the casing 20 and key-operable from the exterior thereof.

The attaching bar 10 is of elongated rectangular shape, and as best illustrated in FIG. 5, it is formed with a longitudinally extending, centrally disposed, relatively narrow slot 11, extending from adjacent one end to adjacent the other end of bar 10. The transverse dimension of the slot 11 is such as to slidably accommodate the stems of fasteners, preferably threaded bolts 12. The threaded bolts may thus be positioned at any desired locations along the length of the slot 11 in attaching bar, for attaching the machine A to the upper surface of the supporting member B.

The fastening devices 12 extend through the slot 11 in bar 10, through appropriate openings formed in the shelf or supporting member B, and into suitable openings in the base of the machine. Preferably, in accordance with the invention, the fastening devices engage the spaced, threaded openings normally provided in the base or bottom surface of the machine for accommodating means to retain the machine in fixed position during shipment, and/or for attaching rubber feet to hold the machine against sliding on the supporting surface when in use.

In FIG. 2, the device is shown as positioned diagonally relative to the longitudinal and transverse margins of the base of the machine and the supporting member B. In accordance with the invention, the machine A is firmly attached to the upper surface of the supporting member B. This is preferably achieved by means of threaded bolts 12 extending through the slot 11 in attaching bar 10 disposed on the bottom surface of support B, and extending through openings formed in supporting member B in position to register with, say, the corresponding pair of diagonally aligned openings 14a and 14b in the base of the machine. It will be evident, of course, that the device may be disposed in a position parallel to either the longitudinal or the transverse dimension of the machine. In either of the latter events, the openings through the supporting member B would be correspondingly spaced and related to one another to enable the attaching member 10 to be disposed with the slot 11 thereof in register with the transversely spaced pairs of openings 14a, 14c, or 14b, 14d, or with the longitudinally spaced pairs of openings 14a, 14d or 14c, 14b in the base of the machine.

With the machine A thus attached to the upper surface of the shelf or other supporting member B, it will be evident that removal of the machine from the surface of the support would require only the loosening and removal of the fastenings 12 from their connection with the threaded openings in the base of the machine A. This, of course, would entail only the use of a wrench or similar tool for engaging the head of each of the fastenings 12 to unthread the latter.

In accordance with the invention, such loosening or removal of the fastenings 12 from their connection with the machine is effectively prevented by the provision of the above-mentioned protective shield means functioning to preclude access to the heads of the fasteners 12, unless the shield means is first removed from its shielding position. By thus preventing the loosening and removal of the fastenings 12 from their connection with the machine, lifting or removal of the machine from the support B becomes such a tedious and troublesome or time-consuming task as effectively to dissuade or discourage a thief or other unauthorized person from proceeding with his effort to remove the machine from its position on the support B.

As more clearly appears from FIGS. 3 and 5, the attaching bar 10 is formed at one of its ends with a flanged portion 15 extending in a plane substantially at a right angle to the plane of the elongated slotted portion of the bar. At its opposite end, the bar 10 is formed with an offset portion 16 also extending downwardly, as shown at 17, with respect to the slotted portion of the bar. The offset portion 16 is disposed in a plane preferably extending substantially parallel to the plane of the main or slotted portion of bar 10.

The right-angularly extending flange 15 is formed with a centrally located, elongated slot or opening 18 extending lengthwise of the flange. As more clearly shown in FIG. 4, the opening 18 in flange 15 serves as a keeper for receiving the sliding bolt of a locking device fixed within the member 20 at one end of the latter.

The protective shield means for precluding access to the heads of the fastening members 12 comprises, in the preferred embodiment of the invention, an elongated trough-shaped member 20, dimensioned to envelop or encase the attaching bar 10 and hence also the heads of fastening members 12 securing the machine A to the support B.

The trough-shaped protective shield 20 has a bottom wall 21, a pair of side walls 22 integral therewith and each extending in a plane at a right angle with respect to the plane of the bottom wall, and a pair of end walls 23, 24 also integral therewith and each extending in a plane at a right angle with respect to the plane of the bottom wall 21 and also with respect to each of the side walls 22.

Connected to the upper edge of the wall 24 and to corresponding edges of each of the side walls 22 adjoining wall 24 is a bridging portion 25 having its inner edge 26 terminating relatively closely to, e.g., a distance of three-quarters of an inch to 1 inch from, the end wall 24.

At the opposite end of the shield or encasing member 20, adjacent the end wall 23 thereof, there is disposed, in fixed position, preferably by soldering or brazing the same to the inner surfaces of the opposite side walls 22, a conventional sliding bolt-type key-operated lock 27.

In positioning the protective shield member 20 so that it will prevent access to the heads of the fasteners 12, it is but necessary to insert the member 20 over member 10, so that the portion 25 of the shield member is engaged behind the offset portion 16 of member 10, and then swing member 20 toward the bar 10, as shown in FIG. 3, until the flange 15 of the bar member is positioned immediately adjacent the inner end wall of the lock mechanism 27.

By suitably dimensioning the shield guard member 20 and the attaching bar 10, the shield may readily be caused to encase the attaching member 10 and the fastener devices 12 utilized for attaching the typewriter or other machine to the supporting member B. As will best be seen from FIG. 4, when the shield member 20 has been properly positioned with respect to the attaching member 10, access to the fasteners 12 is precluded when the shield member has been locked in position by means of the key 29 for operating the locking mechanism 27 to cause the locking bolt thereof to enter and be retained in the keeper opening 18 until withdrawn from that position by the insertion and appropriate manipulation of the key 29 in slot 30. Manual removal of the machine A from the surface of the supporting member B is thereby precluded as long as the shield member 20 remains in its aforesaid position enclosing and preventing access to the heads of the fasteners 12.

When the owner of the machine or its lessee or other authorized person desires to remove the machine A from the support B, as for re-locating or for servicing the same, he need but insert the key 29 in the slot 30 and turn the same to withdraw the bolt 28 from the keeper opening 18. He may then remove the shield member 20 from its engagement with bar 10. This may best be done by first swinging the shield member a short distance away from (i.e., in the direction opposite the direction of the arrow in FIG. 3) the attaching bar, and then moving it (shield 20) a distance lengthwise thereof sufficient to enable the transverse inner edge of the bridging portion 25 to clear the outer edge of the offset end portion 16 of the bar 10.

As will now be apparent, when the shield member 20 has been removed from its position in engagement with the attaching bar 10 and encasing the latter, the heads of the fastener members 12 are fully accessible for the requisite turning thereof in order to remove the fasteners from their connection with the base of the machine.

What is claimed is:

1. A device for preventing removal of portable equipment from a supporting member, comprising (1) an attaching member of substantially flat cross-section adapted to be positioned on the bottom surface of said supporting member and having removable means associated therewith for fastening such equipment to the upper surface of said supporting member, and (2) an elongated shield member engageable with said attaching member, said shield member comprising a pair of spaced substantially parallel side walls each integrally joined at one of their edges by a bottom wall and extending in a plane at right angles with respect to the plane of said bottom wall, said bottom wall being substantially imperforate throughout its length, said shield member serving to completely envelop and encase said attaching member and said removable fastening means when the shield member is in full engagement with said attaching member, said shield member having a locking mechanism fixedly attached therein between said side walls at one end of the shield member, said locking mechanism including a key operable locking element to render said shield member immobile with respect to said attaching member.

2. A device as defined in claim 1, wherein said attaching member comprises an elongated, substantially rectangular bar formed with a centrally disposed, relatively narrow opening extending longitudinally throughout substantially the entire length thereof for the reception of the said fastening means.

3. A device as defined in claim 2, wherein said bar is formed at one of its ends with a flange, said flange being disposed substantially at a right angle to the plane of the main portion of the bar.

4. A device as defined in claim 3, wherein said flange has an opening formed therein to receive and retain the locking bolt member of said locking mechanism.

5. A device as defined in claim 1, wherein said key-operable element is engageable with a keeper opening disposed at one end of the attaching member.

6. A device as defined in claim 1, wherein said attaching member consists of a substantially flat, relatively elongated bar formed with an interior slot extending longitudinally substantially throughout the length thereof.

7. A device as described in claim 2, wherein said fastening means comprises at least two threaded bolts extending through said opening in the attaching bar at selected places along the length of the opening.

8. A device for preventing removal of portable equipment from the surface of a supporting member, comprising a slotted attaching bar having headed fasteners extending therethrough and engageable with threaded openings normally formed in the base of said equipment, and means for preventing tool access to the heads of said fasteners, said means comprising a trough-shaped shield member for encasing therewithin said attaching bar and the heads of said fasteners, said slotted bar being formed with a flange at one of its ends, said flange having an opening formed therein for reception of the reciprocatable locking element of a key-operated lock fixedly attached within said shield member at the corresponding end of said shield member.

* * * * *